(12) United States Patent
Gasendo

(10) Patent No.: US 7,841,830 B1
(45) Date of Patent: Nov. 30, 2010

(54) RIVER POWER MEGAWATTS PRODUCER

(76) Inventor: Leonardo M. Gasendo, 11238 Leisure Village II, Camarillo, CA (US) 93012

(*) Notice: Subject to any disclaimer, the term of this patent is extended or adjusted under 35 U.S.C. 154(b) by 0 days.

(21) Appl. No.: 12/657,590

(22) Filed: Jan. 25, 2010

(51) Int. Cl.
F01D 23/00 (2006.01)

(52) U.S. Cl. .................... 416/1; 416/7; 416/197 A; 415/2.1; 415/5; 415/124.1; 415/148

(58) Field of Classification Search .............. 415/2.1, 415/3.1, 4.1, 5, 140, 124.1, 148; 416/1, 7, 416/8, 197 A, 119
See application file for complete search history.

(56) References Cited

U.S. PATENT DOCUMENTS

| | | | | |
|---|---|---|---|---|
| 762,134 A | * | 6/1904 | Burchim | 416/7 |
| 813,648 A | * | 2/1906 | Horton | 416/7 |
| 953,455 A | * | 3/1910 | Beelman | 416/7 |
| 1,417,000 A | | 5/1922 | Vogt et al. | |
| 1,497,158 A | * | 6/1924 | Piper | 416/7 |
| 1,517,750 A | * | 12/1924 | Powe | 416/7 |
| 1,565,910 A | * | 12/1925 | Damon | 416/7 |
| 1,707,795 A | * | 4/1929 | Brown | 416/8 |
| 3,504,985 A | * | 4/1970 | Fisher | 415/5 |
| 4,054,031 A | * | 10/1977 | Johnson | 60/496 |
| 4,242,868 A | * | 1/1981 | Smith | 60/496 |
| 4,353,702 A | | 10/1982 | Nagy | |
| 4,619,582 A | * | 10/1986 | Slonim | 416/8 |
| 2009/0230684 A1 | * | 9/2009 | Gasendo | 290/53 |

* cited by examiner

Primary Examiner—Igor Kershteyn
(74) Attorney, Agent, or Firm—Richard S. Erbe

(57) ABSTRACT

A river power generating apparatus is provided in which a plurality of angular baffles are configured to extract and combine the available energy from flowing river water into a force for rotating an electric generator to 1800 rpm to produce large quantities of electric current without using a hydro-electric dam thereby allowing wild salmon to spawn upstream of the river. The angular baffles can harvest and convert the energy of the ocean currents and tides into great amounts of electric power.

9 Claims, 2 Drawing Sheets

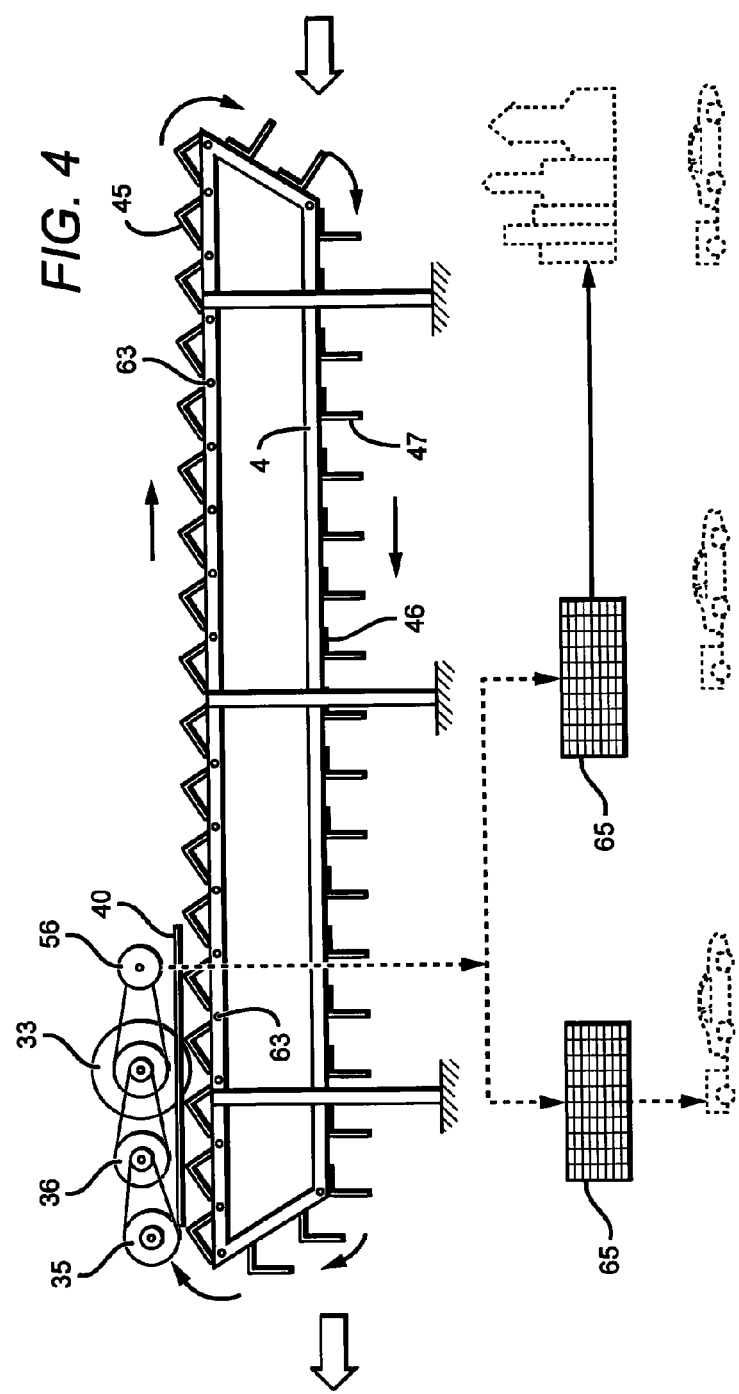
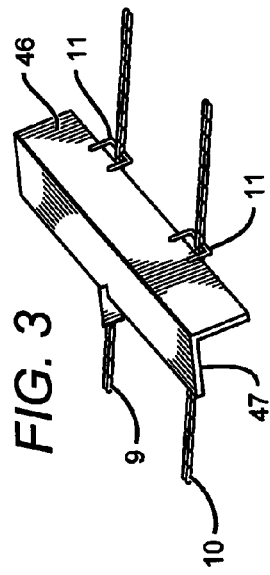
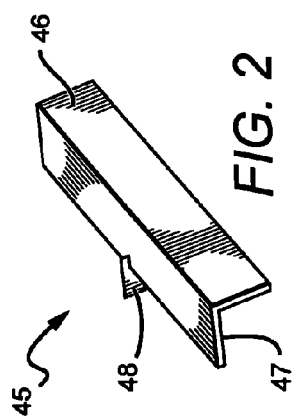

RIVER POWER MEGAWATTS PRODUCER

REFERENCES CITED

U.S. Patent Documents

U.S. Pat. No. 4,353,702 October 1982 Nagy . . . 440/8
U.S. Pat. No. 1,417,000 May 1922 Vogt . . . 440/132 B

BACKGROUND OF THE INVENTION

At present the oil deposits in the Middle East are getting depleted rapidly so much so that the industrialized countries are frantically searching for alternative fuels as well as for other sources of energy. Although the hydroelectric dam is generating significant amounts of electricity there are environmental problems created by the dam as follows: (i) the hydroelectric dam is choking the river and preventing the wild salmons from spawning upstream of the river (ii) the big lakes created by the dam have destroyed the river habitats and valuable artifacts. (iii) records show that due to earthquakes and metal fatigue the old hydroelectric dams have collapsed and wiped out the downstream cities. A river power megawatts producer is provided in order to extract the energy from the river without using a hydroelectric dam.

SUMMARY OF THE PRESENT INVENTION

It is the object of the present invention to provide a river power megawatts producer that is inexpensive to construct for harvesting and converting the available energy from the flowing river into inexpensive electric current. The present invention does not use the hydroelectric dam for operation and will not prevent the wild salmons from spawning upstream of the river.

Another object of the present invention is to harvest and convert the available energy from flowing water into large quantities of megawatts of electric current to supply the power needs of the cities, towns and municipalities.

A further object of the present invention is to use the river power megawatts producer for harvesting and converting the available energy from ocean currents and tides into inexpensive electricity.

BRIEF DESCRIPTION OF THE DRAWINGS

FIG. 2 is an isometric view of the angular baffle for use in an exemplary embodiment according to the present invention;

FIG. 3 is an isometric view of the U-connector for use in an exemplary embodiment according to the present invention, and FIG. 4 is a side view of an exemplary embodiment according to of the present invention.

DETAILED DESCRIPTION OF THE EMBODIMENTS

Figure 1:
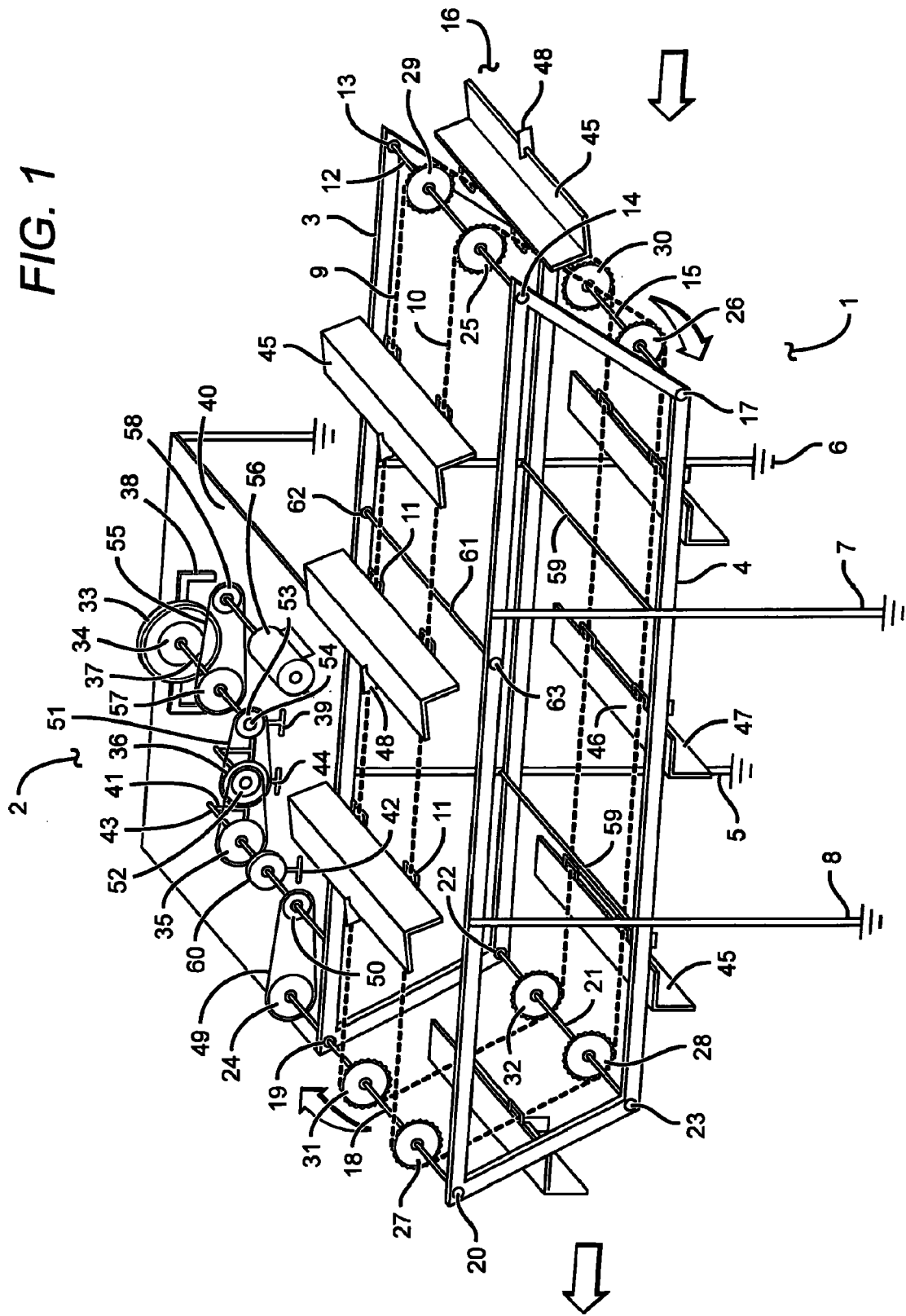
FIG. 1 is an isometric view of an exemplary embodiment according to the present invention.

Referring to the drawings, there is illustrated in FIG. 1 a river power megawatts producer that includes a baffle assembly 1 and a flywheel assembly 2. The baffle assembly 1 includes a pair of trapezoidal frames 3 and 4 which are identical to each other, a pair of circumferential chains 9 and 10 which are identical to each other, a plurality of circular gears 25, 26, 27, 28, 29, 30, 31 and 32 which are identical to each other, a plurality of angular baffles 45 which are identical to each other and a plurality of vertical supports 5, 6, 7 and 8.

As can best be seen in FIG. 1 a plurality of U-connectors 11 are disposed equidistantly and pivotally through the links of the chains 9 and 10. Referring further to FIG. 1 the drive shaft 12 is rotatably supported in the bearing assemblies 13 and 14, the drive shaft 15 is rotatably supported in the bearing assemblies 16 and 17, the drive shaft 18 is rotatably supported in the bearing assembly 20 and through the bearing assembly 19, and the drive shaft 21 is rotatably supported in the bearing assemblies 22 and 23. The drive pulley 24 is secured to the drive shaft 18 that extends through the bearing assembly 19.

Equidistantly disposed and spacedly aligned for operation, the circular gear 25 is secured to the drive shaft 12, the circular gear 26 is secured to the drive shaft 15, the circular gear 27 is secured to the drive shaft 18 and the circular gear 28 is secured to the drive shaft 21. The circumferential chain 10 is rotatably engaged with the circular gears 25, 26, 27 and 28. The drive shafts 12, 15, 18 and 21 are parallel to each other.

Also equidistantly disposed and spacedly aligned for operation the circular gear 29 is secured to the drive shaft 12, the circular gear 30 is secured to the drive shaft 15, the circular gear 31 is secured to the drive shaft 18, and the circular gear 32 is secured to the drive shaft 21. The circumferential chain 9 is rotatably engaged with the circular gears 29, 30, 31 and 32.

In FIG. 1 the flywheel assembly 2 includes a plurality of rpm enhancer pulleys 35 and 36, a flywheel 33 both sides of which are provided with concentric channels 34, an automatic transmission 60, a drive pulley 53 having a ratchet bearing 54 and a power generator 56. The drive shaft 37 of the flywheel 33 is horizontally and rotatably supported in the bearing assemblies of the supports 38 and 39. As can best be seen in FIG. 1 the supports 38, 39, 41, 42 and 44 are secured to the platform 40.

Referring now to FIG. 2 the support side 46 of the angular baffle 45 forms approximately an angle of 90 degrees with the impact side 47.

As can best be seen in FIG. 3 the U-connector 11 is fixedly secured to the support side 46 of the baffle 45. As shown in FIG. 1 the baffles 45 are spacedly disposed parallel to the drive shafts 12, 15, 18 and 21.

Further in FIG. 1 the drive belt 49 is rotatably engaged with the pulleys 24 and 50, the drive belt 51 is rotatably engaged with the pulley 52 and the pulley 53 which is provided with a ratchet bearing 54. The drive belt 55 is rotatably engaged with the pulley 57 and the pulley 58 of the power generator 56.

In FIG. 1 the present invention operates as follows: the flowing water (indicated by the arrow) pushes the submerged baffles 45 and actuates the chains 9 and 10, at the same time rotating the drive shafts 12, 15, 21 and 18. As the circumferential chains 9 and 10 pull the baffle 45 downwardly over the shaft 12 the trapezoidal frames 3 and 4 automatically flip the baffle 45 to an open position ready to submerge and receive the impact force of the flowing water. The stabilizer fins 48 prevent the sideways drifting of the submerged baffles 45 during operation. The automatic transmission 60 and the enhancer pulleys 35 and 36 accelerate the power generator 56 to 1800 rpm to produce electric current.

As the circumferential chains 9 and 10 pull the baffles upwardly over the drive shaft 21 the trapezoidal frames 3 and 4 automatically flip the baffles 45 to a closed position. In the open position, the support side 46 of the baffle 45 is supported by the circumferential chains 9 and 10 such that the impact side 47 of the baffle 45 is oriented at approximately 90 degrees to the path of the flowing water.

During operation the buildup of high torque at the low rpm drive shaft 18. rotates the rpm enhancer pulleys 24, 35, 36, 57 and automatic transmission 60 thereby rotating the power generator 56 to 1800 rpm to produce electric current. The flywheel 33 is fine tuned by inserting the exact lead weights and counterweights into the concentric channels 34 for storing energy as well as for the spin-test balancing purposes. The baffles 45 are lightweight and float on water. The roller shaft 61 is rotatably secured in the bearing assemblies 62 and 63 for minimizing the sagging of chains 9 and 10 during operation.

During emergency shutdowns the ratchet bearing 54 of the pulley 53 provides a shock absorber protection to the equipments and safety protection to the operators by allowing the flywheel 33 to rotate harmlessly until the forces of inertia are dissipated. In FIG. 4 more angular baffles will be used for storing the electric current or charging fully the unlimited number of lithium-ion batteries 65 which will be distributed to the battery stations (in phantom) that will operate like gas stations along the highway wherein the batteries are loaded on trailers (in phantom) and connected in 10 seconds with the electric car (in phantom) that will travel for 500 miles without recharging and without discharging any pollutants to the atmosphere thus resulting in clean air.

The operating advantages of the present invention are: (i) the angular baffles 45 do not use an expensive hydroelectric dam for extracting continuously the energy from the flowing river to produce electric current, (ii) the angular baffles 45 do not prevent wild salmon from spawning upstream of the river (iii) the downstream people living at the river bank are not exposed to the dangers of flash flood. (iv) every one mile stretch of the river can be used to supply the electric current needs of the towns and cities (v) a plurality of submerged baffles 45 are provided to harvest and combine the available energy from the flowing river into a giant force for rotating the power generator 56 to produce large quantities of electric power, (vi) the trapezoidal frames 3 and 4 automatically open and close the baffles 45 during operation, (vii) the circular chains 9 and 10 enable the baffles 45 to extract continuously the energy from the river, (viii) the ratchet bearing 54 provides shock absorber protection to the equipment and safety protection to the operators during emergency shutdowns wherein the flywheel 33 is allowed to rotate harmlessly until the forces of inertia are dissipated, (ix) the present invention can also be used for harvesting the energy from the ocean current and ocean tide. It is to be understood that many changes and modifications to the embodiment can be made therein without departing from the scope of the present invention.

I claim:

1. An apparatus for producing energy from flowing water comprising:
    a baffle assembly, said baffle assembly further comprising:
        a pair of opposed trapezoidal frames;
        a plurality of vertical supports supporting said frames;
        a pair of horizontal bars extending between and connecting said frames;
        a plurality of drive shafts attached to said frames;
        a plurality of circular gears mounted on said drive shafts;
        at least two endless chains engaged with said circular gears;
        a plurality of u-connectors pivotally attached to said endless chains; and
        a plurality of angular baffles, each of said baffles attached to one of said u-connectors; and
    a flywheel assembly mechanically connected to said baffle assembly by a power generator shaft.

2. The apparatus according to claim 1, wherein said each of said angular baffles further includes a stabilizer for preventing sideways drifting of the baffles during operation.

3. The apparatus according to claim 1, wherein each of said angular baffles is configured to move between an open position and a closed position in conjunction of the movement of the chains.

4. The apparatus according to claim 3, wherein the movement of said chains is caused by the impact of flowing water on the angular baffles.

5. The apparatus according to claim 1, wherein said flywheel assembly comprises:
    a flywheel having concentric channels mounted on a drive shaft;
    a drive pulley connected to said drive shaft;
    a plurality of rpm enhancer pulleys connected to said drive shaft; and
    an automatic transmission connected to said rpm enhancer pulleys.

6. The apparatus according to claim 5, wherein said flywheel assembly is connected to a power generator.

7. A method of generating power from the motion of water flowing in a predictable direction, said method comprising the steps of:
    providing a pair of opposed trapezoidal frames attached to a plurality of supports;
    attaching a plurality of drive shafts attached to said frames;
    connecting a plurality of circular gears on said drive shafts;
    providing at least two endless chains engaged with said circular gears;
    pivotally attaching a plurality of u-connectors to said endless chains;
    attaching a plurality of angular baffles to said u-connectors, said baffles configured to move between an open position and a closed position in conjunction with the movement of the chains; and
    submerging said frames, said gears, said supports, said drive shafts, said chains and said baffles in flowing water, said baffles disposed so that they are in the open position when submerged in the water generally perpendicular to the direction in which the water is flowing.

8. The method according to claim 7, further providing the step of attaching stabilizer fins to said baffles.

9. The method according to claim 7, further providing the step of attaching said drive shafts to a flywheel assembly.

* * * * *